United States Patent [19]

Taniyama

[11] Patent Number: 5,477,961
[45] Date of Patent: Dec. 26, 1995

[54] STORAGE CONTAINER FOR DIGITAL MEDIA AND ASSOCIATED MATERIALS

[76] Inventor: Yoshihiko Taniyama, 9380 Old Southwick Pass, Alpharetta, Ga. 30202

[21] Appl. No.: 270,038

[22] Filed: Jul. 1, 1994

[51] Int. Cl.[6] .................... B65D 85/57; B65D 85/30
[52] U.S. Cl. ............... 206/310; 206/308.1; 206/45.19
[58] Field of Search ................ 206/45.15, 45.19, 206/309, 310, 311, 312, 313, 444

[56]  References Cited

U.S. PATENT DOCUMENTS

| | | | |
|---|---|---|---|
| D. 260,122 | 8/1981 | Turner | D3/35 |
| D. 342,379 | 12/1993 | Taniyama | D3/35 |
| 4,327,831 | 5/1982 | Inaba et al. | 206/310 |
| 4,702,369 | 10/1987 | Philosophe | 206/312 |
| 4,709,812 | 12/1987 | Kosterka | 206/310 |
| 4,793,480 | 12/1988 | Gelardi et al. | 206/312 |
| 4,819,799 | 4/1989 | Nomula et al. | 206/310 |
| 4,895,252 | 1/1990 | Nomula et al. | 206/310 |
| 4,916,567 | 4/1990 | Grobecker et al. | 360/133 |
| 5,016,752 | 5/1991 | Haugen, Jr. | 206/455 |
| 5,101,971 | 4/1992 | Grobecker | 206/232 |
| 5,165,541 | 11/1992 | Morita | 206/387 |
| 5,188,230 | 2/1993 | O'Brien et al. | 206/312 |
| 5,249,677 | 10/1993 | Lim | 206/310 |
| 5,259,498 | 11/1993 | Weisburn et al. | 206/45.15 |
| 5,285,893 | 2/1994 | Misterka et al. | 206/310 |
| 5,310,053 | 5/1994 | Lowry et al. | 206/310 |
| 5,310,054 | 5/1994 | Stumpff et al. | 206/310 |
| 5,341,924 | 8/1994 | Marrone | 206/232 |
| 5,366,073 | 11/1994 | Turrentine et al. | 206/309 |
| 5,381,894 | 1/1995 | Misterka et al. | 206/310 |

*Primary Examiner*—Steven N. Meyers
*Assistant Examiner*—Tara L. Laster
*Attorney, Agent, or Firm*—Troutman Sanders; Joel S. Goldman; John A. Savio, III

[57]  ABSTRACT

A storage container for an optical compact disk is described which includes a base tray, a cover and a disk tray. The inventive storage container includes protrusions on an inside portion of the cover for securing large booklets and promotional material. A motion limiting mechanism is formed along an entire length of a portion of the cover near the base tray for limiting the amount of rotation of the cover with respect to the base to approximately 180 degrees. The disk tray is adapted to snap securely into the base tray and includes a hub located in a cylindrical recess for engaging a centralized hole of the compact disk.

13 Claims, 7 Drawing Sheets

STORAGE CONTAINER FOR DIGITAL MEDIA AND ASSOCIATED MATERIALS

BACKGROUND OF THE INVENTION

1. Technical Field

This invention relates to a storage case for optically readable compact disks and related promotional material. More specifically, this invention relates to a three-component transparent container in which information storage media, such as compact disks, may be packaged with promotional material for retail sale and used for storage by the consumer.

2. Description of the Prior Art

As shown in FIG. 8, a prior art storage container 10' includes three components, a base tray 50', a cover 30', and a disk tray 25'. Though the dimensions of the container 10' may vary to adapt to different sized mini-disk cartridges (or other six-sided, three-dimensional objects, generally referred to as "hexahedrons"), is designed for a typical mini-disk cartridge 13' in which an optical disc is encased in a rectangular enclosure.

The cover 30' includes two side walls 34' which extend perpendicularly from a top inside surface 32'. From each side wall 34' one or more side tabs 36' protrude inwardly. The side tabs 36' are positioned a sufficient distance from the top inside surface 32' to allow for the insertion of a booklet or card 26' between the side tabs 36' and the top inside surface 32'. At least one small front tab 46' protrudes upwardly from a portion of the inside surface of the cover 30' to keep the booklet or card 26' in place once it rests against the cover's rear wall 42'. Side walls 34' have a capture protrusion 48' extending inwardly.

The base tray 50' includes a pair of side walls 80', a front wall 78', and a rear wall 71', which extend perpendicularly from a bottom inside surface 52'. Side walls 80' have a cover capture dimple 90', which correspondingly matches the capture protrusion 48' extending from the cover 30'. Additionally, side walls 80' have a disk tray capture dimple 88' on both sides of the side wall notch 82'. Each base tray side wall 80' has a pivot depression or hole 49' in the exterior portion of its rear end 75' which corresponds to the pivot protrusion 40' on the cover 30'.

The disk tray 25' has a recess 85' having dimensions slightly larger than the length and the width of a mini-disk cartridge 13'. The recess 85' has a centralized hub 54' which engages a centralized hole 15' of the mini-disk cartridge 13' to secure the said cartridge onto tray 25'. Capture protrusions 86' are located on both sides of the side wall notches 83', which correspond to the capture dimples 88' of the base tray 50'.

The base tray 50' and the cover 30' are hingedly attached. The disk tray 25' is attached to the base tray 50' by inserting the disk tray's capture protrusions 86' into the base tray's disk tray capture dimples 88'.

This container has several disadvantages. First, the illustrated prior art container 10' may only be used to house mini-compact disk cartridges. Furthermore, there is insufficient room within the container to accept additional amounts of promotional material and other booklet products which accompany the compact disk product.

It is often desirable to retail larger amounts of promotional and informative booklets with compact disks that are sold in a set, or with compact disks which have multimedia data etched thereon for use in personal computers. In the case of a musical compact disk box set, booklets may contain lists of selections, lyrics for musical disks, and historical data on the musical artist. On the other hand, compact disks which contain multimedia data thereon should be sold with booklets which inform the personal computer user of directions for use, sample illustrations, and other important information relating to use of the product. For both musical box sets and multi-media compact disk packaging purposes, it is desirable to store such promotional and informative booklets in the same container which houses the optical multi-media disk, or compact disk so that packaging costs may be reduced.

Conventional containers, including the one illustrated above as well as containers which house conventional compact disks having centralized holes, do not have ample space for large booklets and other promotional media within the container. Therefore, a need exists in the container art for a large, durable, easily opened container which has an appealing appearance and can protect a compact disk recess while allowing more room for promotional material under its cover. A need also exists for a container which houses compact disk, has the appearance of a book and the approximate size of a VHS video cassette container, such that a multitude containers may be stored on a book shelf and have the traditional appearance of a book library.

SUMMARY OF THE INVENTION

The present invention recognizes and addresses the foregoing disadvantages, and others of prior art constructions and methods.

Accordingly it is an object of this invention to provide a container for compact disks which allows a large promotional booklet to be stored with the disk in the container.

It is another object of this invention to provide a container for compact disks or the like which includes a means for identifying the enclosed disk from the bottom view of the container.

It is a further object of this invention to provide a container for compact disks, or the like, in which the bottom surface of the base tray is transparent, planar, and include a means for identifying the enclosed disk from the bottom view of the container.

It is yet a further object of this invention to provide a container for compact disks, or the like, which includes a means for limiting the motion of the cover.

Still another object of this invention to provide a container for compact disks, or the like, which keeps the base tray and cover securely together when in the closed position.

Still another object of the present invention to provide a large, durable, easily opened container which has an appealing appearance.

Finally, another object of the present invention is to provide a container which protects a compact disk while allowing more room in the container for promotional material.

Generally speaking, the invention relates to an improved, three-piece container for housing an optical compact disk therein. The container is comprised of a disk tray for securing a disk therein, a base tray for receiving the disk tray, and a cover hingedly attached to the base tray for covering the disk tray and compact disk housed therein.

More specifically, the base tray includes an inside bottom surface, a pair of side walls protruding upwardly from the inside bottom surface, a rear wall extending upwardly from the inside bottom surface, and a front wall extending upwardly from the inside bottom surface.

The container cover includes an inside top surface, a pair of parallel side walls protruding downwardly from its inside top surface, and a pair of tabbed protrusions on an inside portion of each of the side walls of the cover. Each of the tabbed protrusion are located near inside corners of the cover. Additionally, the cover includes at least one longitudinal protrusion disposed on an inside surface of the cover, parallel to a forward portion of cover for retaining promotional material between the tabbed protrusions. The longitudinal protrusion may also be formed integrally with the cover side walls. Finally, the cover also includes motion limiting means for limiting the amount of rotation of the cover respect to the base to approximately 180 degrees.

The container also includes a disk tray for mounting the disk and is comprised of a top surface including tab depressions corresponding in shape and position to the tabbed protrusions in the side walls of the cover, and a recessed surface for securing the disk. The recessed surface in the disk tray includes a centralized, substantially circular center surface, a mounting hub integrally formed with the center surface for engaging a centralized hole of the disk, and rectangular surfaces adjacent to the circular surface and disposed between the pairs of tab depressions for providing removal access to a periphery of the disk. The disk tray also includes disk tray fastening means for fastening the disk tray into the base tray.

The disk mounting hub is integrally formed on a raised circular surface on the circular recessed surface of the disk tray so that a lower surface of the disk will not engage the recessed portion of the tray. The disk tray also includes a bottom surface opposite the top disk tray surface, and a pair of disk tray side walls extending downward from the bottom surface. The disk tray also includes reinforcement members formed integrally with the disk tray side walls and the bottom surface. The reinforcement members are located directly underneath the tab depressions, and contact the bottom surface of the base tray so as to increase axial strength of the container when closed.

Other objects, features and aspects of the present invention are discussed in greater detail below.

BRIEF DESCRIPTION OF THE DRAWINGS

The accompanying drawings illustrate the preferred embodiment of the invention, and serve to aid in the explanation of the principles of the invention.

DETAILED DESCRIPTION OF THE INVENTION

Figure 1A:
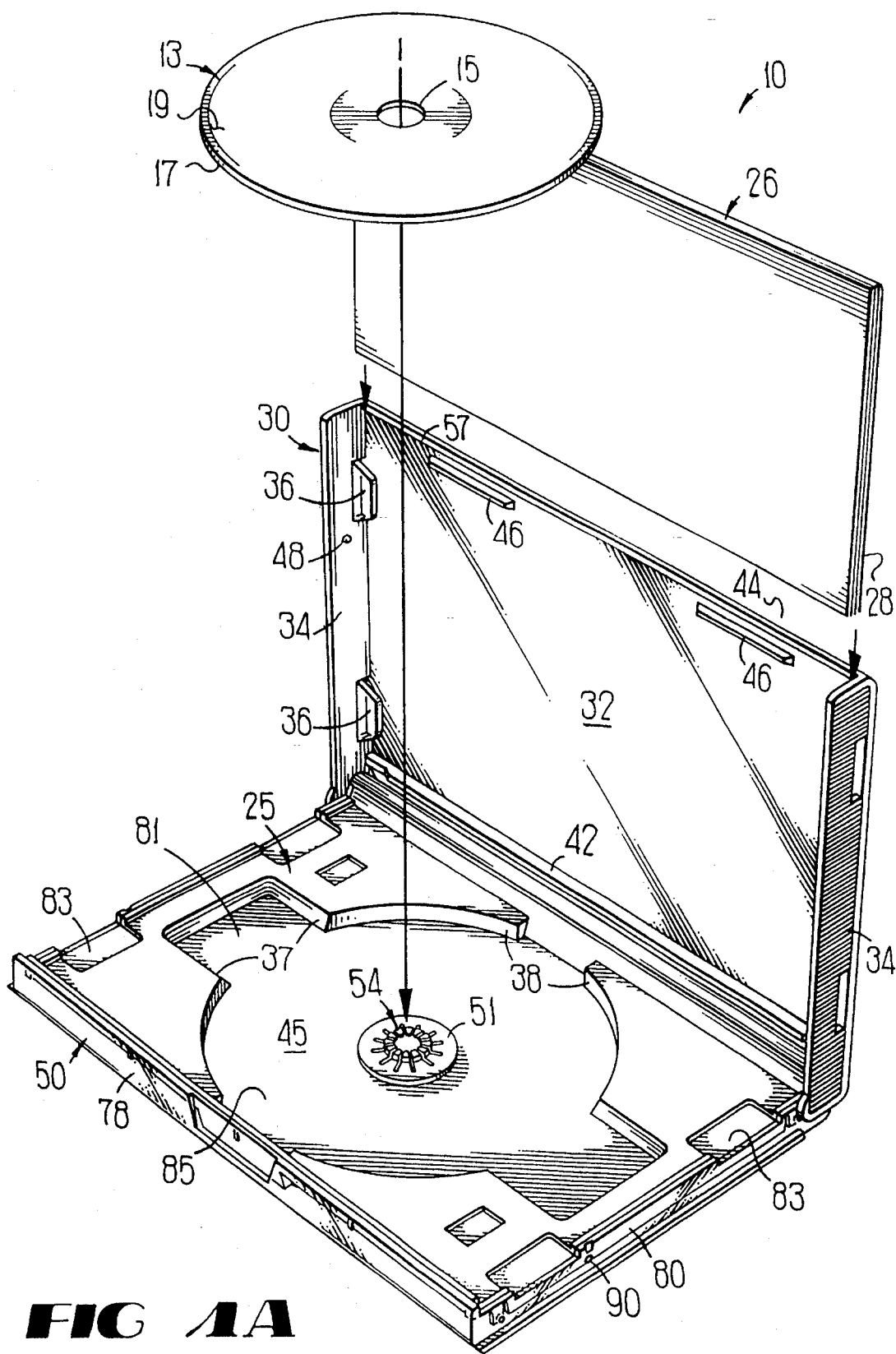
FIG. 1A is a top, front, right side perspective view of a storage container according to the present invention in an open position illustrating a promotional booklet and a compact disk exploded upwardly from the container.

As shown in FIGS. 1 through 6, in a first embodiment of the invention, a storage container 10 is preferably formed of a transparent, plastic material. The container 10 includes three components, a base tray 50, a cover 30, and a disk tray 25. Though the dimensions of the container 10 may vary, a preferred embodiment is designed for a typical optical compact disk 13 in which an optical disc is encased in a rectangular enclosure. The width of the container 10 is approximately 150 millimeters, the length is approximately 200 millimeters and the height is approximately 20 millimeters (see FIG. 2a). The width is designed to be sightly wider than the width of a compact disk 13, while the length and height are employed to allow the container 10 to accommodate additional promotional and informative booklets 26.

Referring back to FIG. 1, the cover 30 includes two side walls 34 which extend perpendicularly from a top inside surface 32. From each side wall 34 one or more side tabs 36 protrude inwardly. The side tabs 36 are positioned a sufficient distance from the top inside surface 32 to allow for the insertion of a large pamphlet or promotional booklet 26 between the side tabs 36 and the top inside surface 32. A small cut out 33 is formed in the center of at least one side wall 34 but preferably both, between the side tabs 36 and the top inside surface 32. The cut out 33 improves the efficiency in the molding process, as well as serving other functions.

A booklet or card 26, with its graphics side 28 facing the cover's top surface 32 (see FIGS. 1 and 3), may be inserted within the cover 30 at the open front end 44 of the cover 30 and slid under the tabs 36 until it rests against a rear wall 42 of the cover 30. At least one small front tab 46, but preferably two, protrudes upwardly from a portion of the inside surface of the cover 30 adjacent the open front end 44 of the cover 30 to keep the booklet or card 26 in place once it rests against the cover's rear wall 42.

The longitudinal front tabs 46, as shown in FIGS. 1 and 6a–6d, have a front tapered edge 95 with a squared off edge 96. The squared off edge 96 is positioned on the side closest to the booklet or card 26. It is utilized to better secure the booklet or card 26 by providing a flat surface for its edge to rest against.

Again referring to FIGS. 1 through 7, at least one side wall 34, but preferably both, also has a capture protrusion 48 extending inwardly. The rear end 31 of each of the cover's side walls 34 has a pivot protrusion 40 extending inwardly.

The base tray 50 includes a pair of side walls 80, a front wall 78, and a rear wall 71, which extend perpendicularly from a bottom inside surface 52. Each side wall 80 has notches 82, which correspond in position to the tabs 36 of the cover 30. At least one side wall 80, but preferably both, has a cover capture dimple 90, which correspondingly matches the capture protrusion 48 extending from the cover 30. At least one side wall 80, but preferably both, also has a disk tray capture dimple 88 on both sides of the side wall notch 82. Each base tray side wall 80 has a pivot depression or hole 49 in the exterior portion of its rear end 75, which corresponds to the pivot protrusion 40 on the cover 30. The depression may extend partially into or fully through the rear end 75 of the side wall 80. The exterior of the base tray's front wall 78 has a slightly recessed area 53, preferably in its center.

Figure 1B:
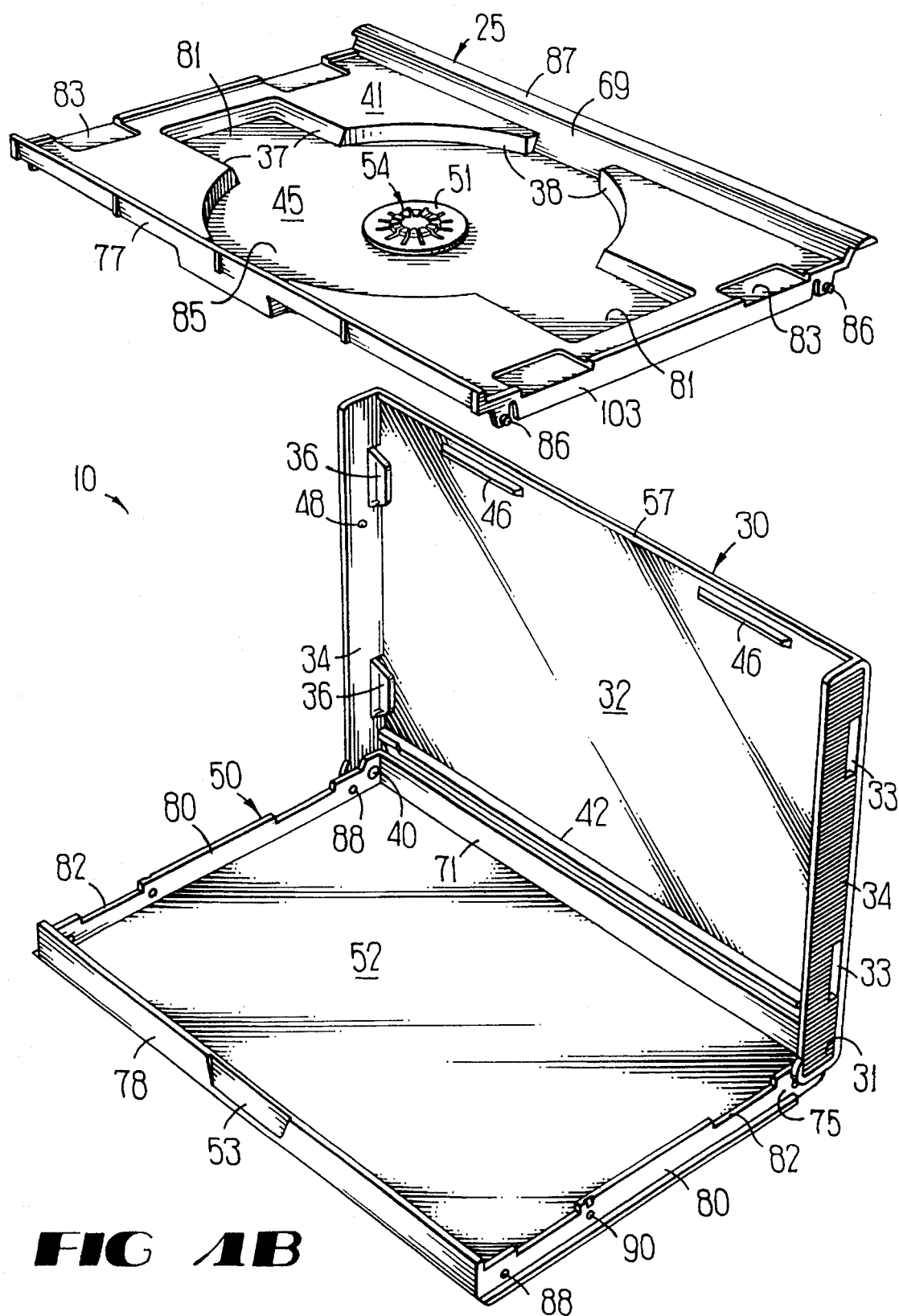
FIG. 1B is a top, front, right side perspective view of the container according to the present invention in an open position illustrating showing a disk tray exploded in an upward direction from the container.
Figure 2A:
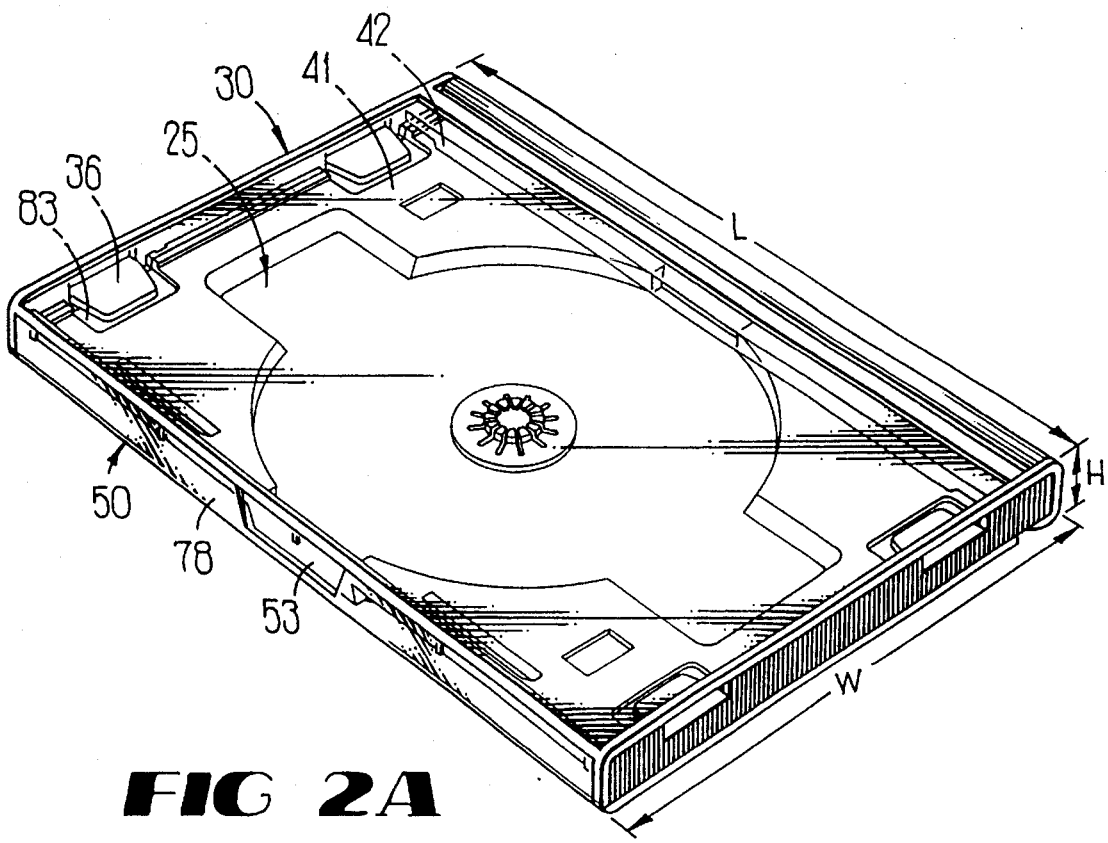
FIG. 2A is a top, front, right side perspective view of the inventive container in a closed position.
Figure 4:
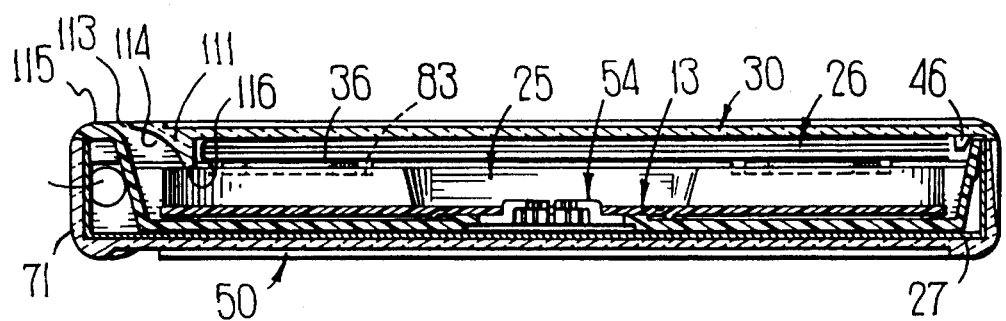
FIG. 4 is a cross section of the container in the closed position first and second set of promotional material, the disk tray and compact disk inserted into the enclosure.

As seen in FIG. 1b, the disk tray 25 has a rear wall 69, a front wall 77, and a rimmed center opening 85 having a diameter slightly larger than a compact disk 13. The rimmed center opening 85 is made up of arcuate walls 38 and a recessed surface 45, which is attached to the bottom edges of the arcuate walls 38. Mounting hub 54 is integrally formed onto bottom surface 45 of recess 85 on circular platform 51. Furthermore gripping recesses 81 are positioned to the rimmed center opening 85 and are formed by walls 37. Gripping recesses 81 allow a user to grip peripheral edges of disk 13 in order to lift the same from mounting hub 54. Protrusion recesses 83 are formed on a top surface of the tray 25 and allow each of the tabbed protrusions 36 to rest therein, as is illustrated in FIGS. 2A and 4. Thus, the promotional material 26 comes to rest between an inside surface of 32 of cover 30 and upper surface 41 when the container is in a closed position, as is illustrated in FIG. 4.

Figure 2B:
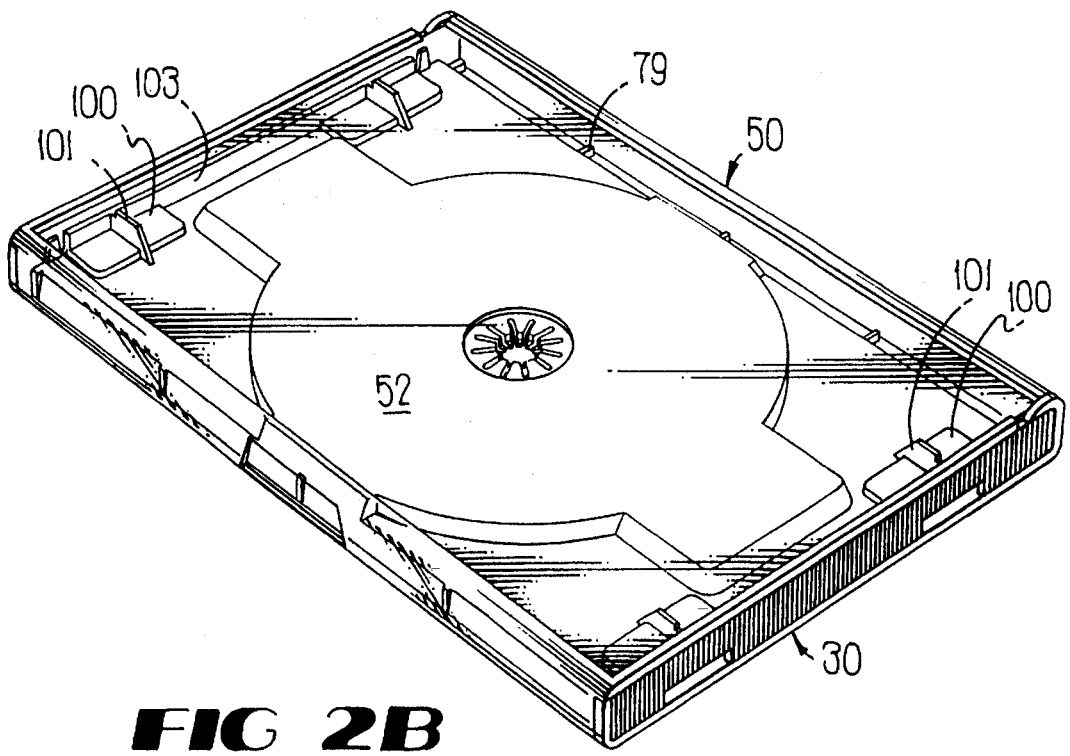
FIG. 2B is a bottom, front, left side perspective view of inventive container in the closed position.

Referring specifically to FIG. 2b, illustrated through transparent base 50 are structural supports 101 which are integrally formed to lower recess surfaces 100 and side walls 103. Supports 101 have a dual function. First, supports 101 simultaneously provide lateral support to side walls 103, thereby stiffening and strengthening disk tray 25. Additionally, supports 101 transfer axial loads from cover 30 through protrusions 36 and recesses 83 to inside surface 52 of base tray 50, thereby increasing axial strength and stiffness of the container as a whole. Such features are generally desired with transparent polymers, such as polystyrene, which has a crystalline or semi-crystalline morphology and therefore tends to be more brittle than opaque polymers. Additionally, molded to the top of the rear wall 69 of the disk tray 25 is a rear ledge 87, which extends across the pivot region of the base tray 50. The rear ledge 87 is supported by at least one, but preferably five structural ribs 79 (see FIG. 2B).

The base tray 50 and the cover 30 are attached by mating the cover's pivot protrusions 40 within correspondingly located base pivot depressions. The base tray's front wall 78 and the cover's front lip 57 rest against each other when the container 10 in the closed position, and the friction they create helps keep the container 10 securely closed. The base tray's front wall 78 is slightly recessed so that the cover's front lip 57 extends over it to allow one to pry open the cover 30 with a finger while holding the container 10 in the other hand. The slightly recessed area 53 on the exterior of the base trays front wall 78 may be utilized as a double finger grip when opening the container. For instance, one hand may be placed over the top of the container and another hand may be placed over a bottom of the container with both thumbs within recess 53, so that the top surface thumb may pry cover 30 upward while the other holds base tray 50 stable. The cover 30 rotates about an axis centered horizontally through the length of the rear base tray wall 71.

As seen in FIG. 1B, the disk tray 25 is attached to the base tray 50 by inserting the disk tray's capture protrusions 86 into the base tray's disk tray capture dimples 88. When the disk tray 25 is inserted, its front wall 77 rests flush against the base tray's front wall 78. The disk tray's rear ledge 87 rests on top of the base tray's rear wall 71.

Figure 3:
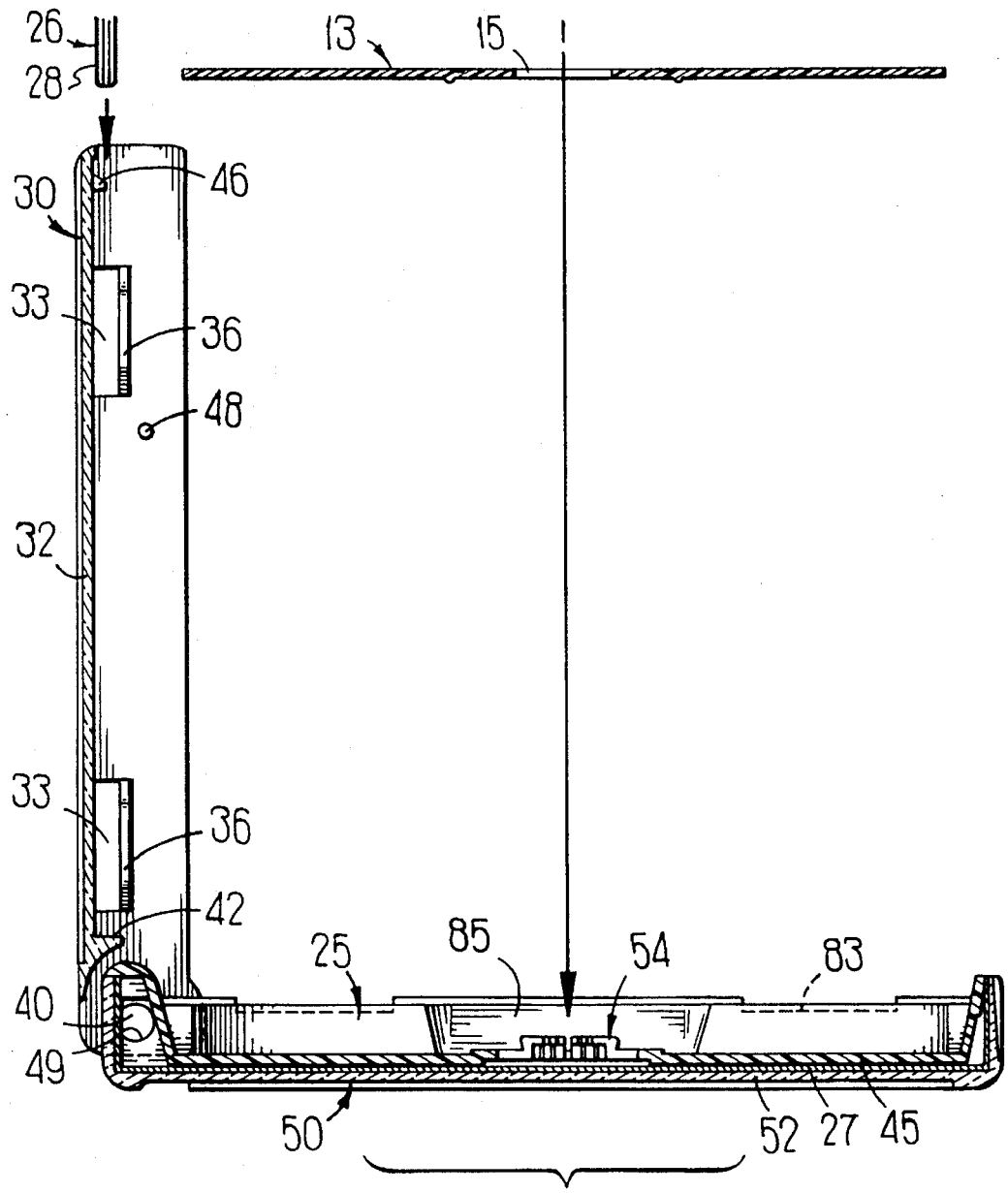
FIG. 3 is a cross section of the container according to the present invention in the open position showing the promotional material and disk about to be inserted into the cover and base, respectively, with the disk tray secured to the base, a second set of promotional materials sandwiched between the disk tray and base.

As shown in FIGS. 3 and 4, promotional material 27 may be inserted facing downward under the disk tray 25. A compact disk 13 may be placed in the container 10 in the disk tray's recess 85 of the disk tray 25 and a booklet or pamphlet 26 may be securely inserted under the cover 30. The compact disk 13 may be inserted into the disk tray 25 with its label side 17 facing the cover 30.

As shown in sequence in FIGS. 6A–6D, promotional booklet 26 may be inserted over tapered portion 95 of longitudinal tabs 46 and under protrusions 36 so as to secure an edge of booklet 26 against a nearly perpendicular edge 95. Tapered portion 95 should form an angle of approximately 75 degrees with respect to the inside surface of cover 30.

Figure 5A:
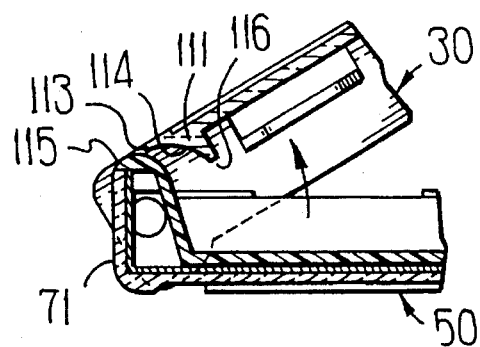
FIG. 5A is an isolated cross sectional view of the container with the lid opened approximately 30 degrees from the closed position.
Figure 5B:
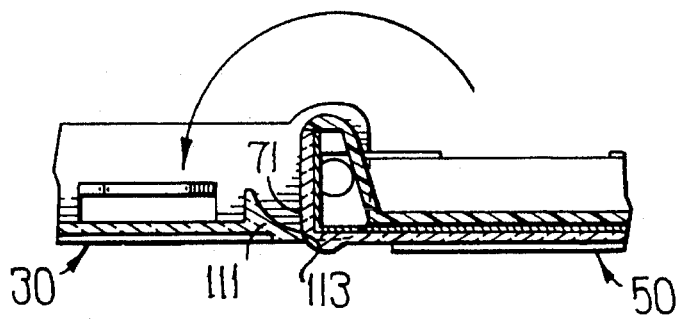
FIG. 5B is an isolated cross sectional view of the container with the lid opened approximately 180 degrees from the closed position, illustrating a motion limiting mechanism on a rear portion of the cover contacting the back wall of the tray.
Figure 6A:
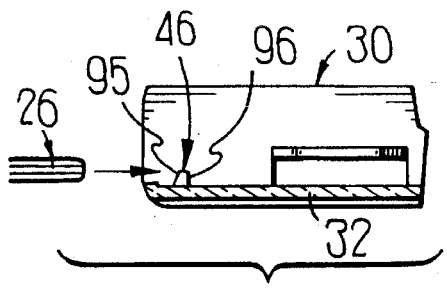
FIGS. 6A–6D illustrate a sequence in isolated cross section of the promotional material being inserted into a front portion of the container cover.
Figure 6B:
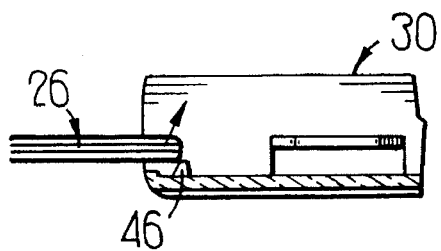
Figure 6C:
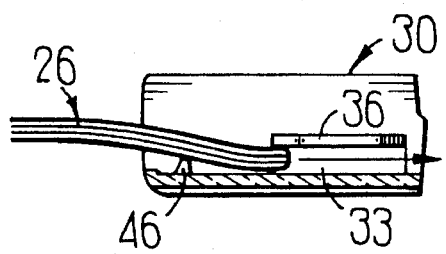
Figure 6D:
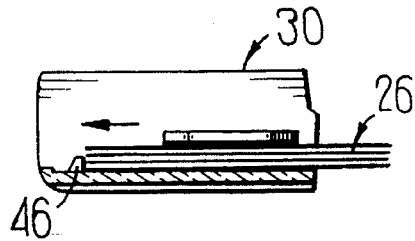

FIGS. 5A and 5B illustrate a motion limiting mechanism for container 10. Generally, the motion limiting mechanism 111 is comprised with a curved portion 114, an engaging protrusion 113, and resting portion 116 As the cover 30 is rotated to an open position, curved portion 114 clears apex 115 of tray 25, and when a 180 degree opening has occurred, protrusion 113 engages back wall 71 of base 50 to stop rotational motion. The 180 degrees motion limitation is preferred because it further insures that the material in the cover 30 does not fall out when then container is in the open position. However, the length of protrusion 113 may be shortened or lengthened to create different cover motion limitations. When cover 30 is closed on base 50, resting portion 116 of motion limiting mechanism 111 rests on a top surface 41 of tray 25. Additionally, the motion limiting mechanism extends along the entire rear portion of the cover to maximize its strength.

Figure 7:
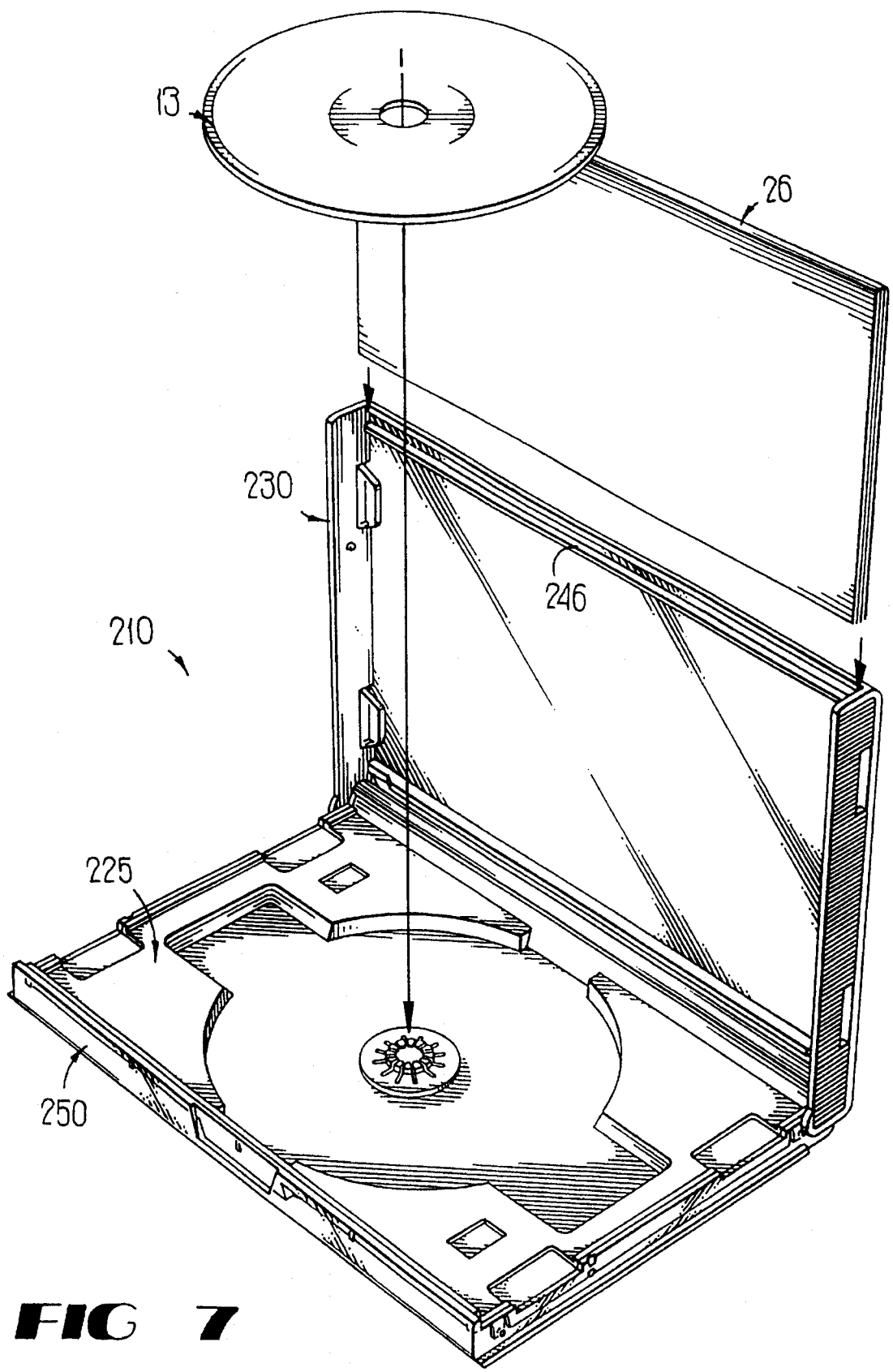
FIG. 7 is a top, front, right side perspective view of a container according to an alternate embodiment present invention in an open position illustrating a promotional booklet and a compact disk exploded in an upward direction.
Figure 8:
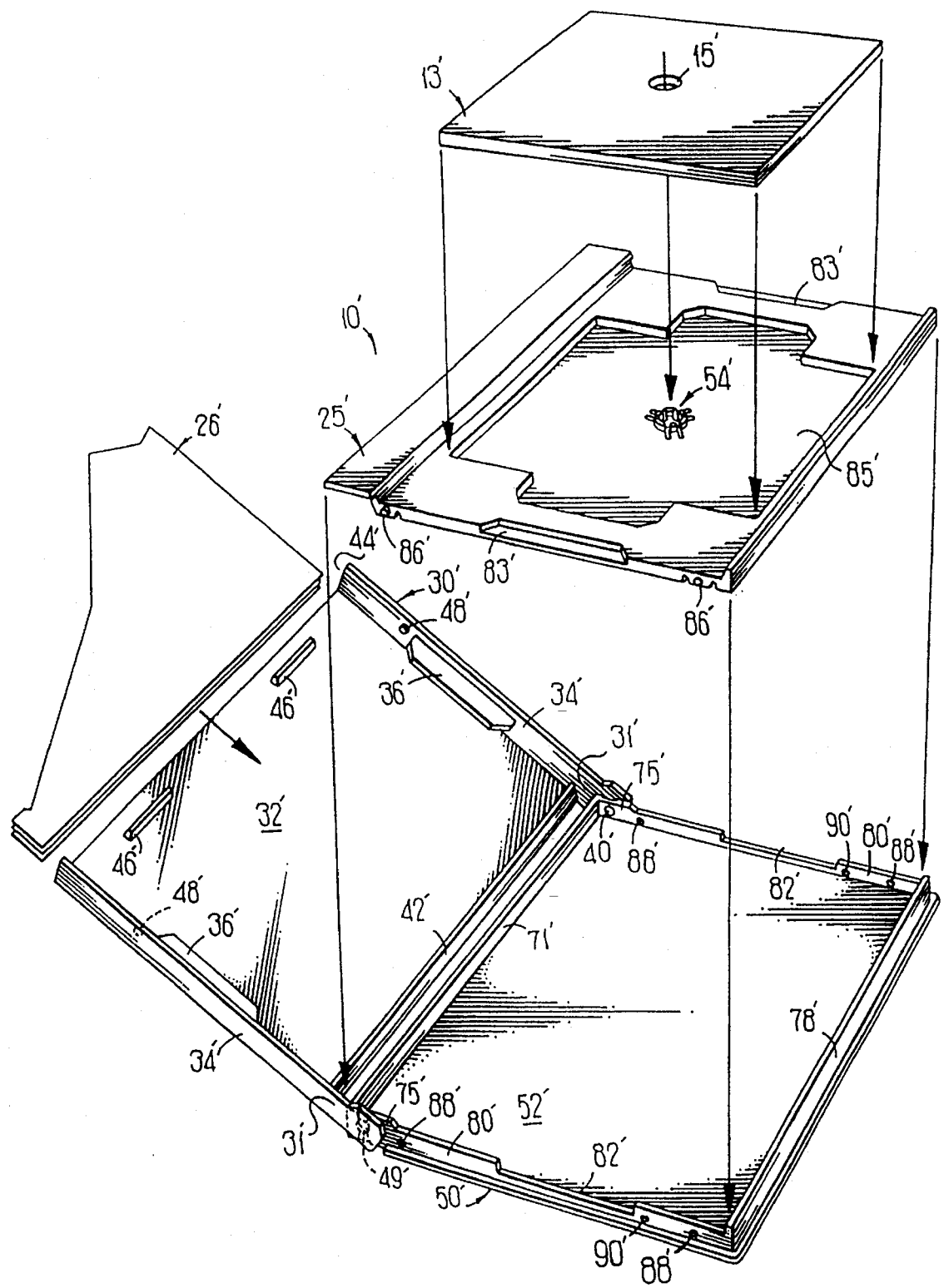
FIG. 8 is an exploded perspective view of a prior art container in the open position having a disk tray with a floor and stepped standoffs, a mini-disk cartridge, and a booklet ready for insertion.

FIG. 7 illustrates an alternate embodiment of the present invention. Container 210 houses disk 13 on tray 225 and promotional material 26 between cover 230 and base 250 in manner identical to that of container 10. In this embodiment protrusion 246 extends along the entire length of cover 230 and has ends which are integrally formed in the side walls of cover 230 in order to provide added axial strength to the same.

It should be understood that various changes to the present invention may be made by the ordinarily skilled artisan, without departing from the spirit and scope of the present invention which is presented in the claims below. The ordinarily skilled artisan will understand that this disclosure presents an example of the invention and is not meant to limit the invention, as presented in the claims, in any way whatsoever.

What is claimed is:

1. A container adapted to hold an object, said enclosure comprising:
    a base tray including,
        an inside bottom surface,
        a pair of side walls protruding upwardly from said inside bottom surface,
        a rear wall extending upwardly from said inside bottom surface, and
        a front wall extending upwardly from said inside bottom surface; and
    a cover including, an inside top surface, a pair of parallel side walls protruding downwardly from said inside top surface, and a pair of tabbed protrusions on an inside portion of each of said side walls of said cover, said tabbed protrusions being located near corners of said cover; and a disk tray for mounting a disk including, a top surface including, tab depressions corresponding in shape and position to said tabbed protrusions in the said side walls of said cover, a recessed surface for securing the disk including, a centralized, substantially circular center surface, a mounting hub integrally formed with said center surface for engaging a centralized hole of the disk, rectangular surfaces adjacent said circular surface and disposed between said pairs of tab depressions for providing removal access to a periphery of the disk, a bottom surface, opposite said top surface, said bottom surface including reinforcement members, wherein said reinforcement members are located directly underneath said tab depressions, and contact said bottom surface of said base tray;

disk tray fastening means for fastening said disk tray into said base tray; and a hinge for hingedly connecting said base tray to said cover.

2. The container of claim 1, wherein said mounting hub is integrally formed on a raised circular surface on said centralized circular surface of said disk tray.

3. The container of claim 1 wherein said cover is formed from transparent plastic material.

4. The container of claim 1 wherein said base tray is formed from transparent plastic material.

5. The container of claim 1 wherein said base tray and said cover are formed from transparent plastic material.

6. The container of claim 1 wherein said disk tray further includes:

a pair of disk tray side walls extending downward from said bottom surface, wherein said disk tray side walls include said disk tray fastening means; and wherein said reinforcement members are formed integrally with said disk tray side walls and said bottom surface.

7. The container of claim 1 further including motion limiting means disposed on said cover including:

a rear edge of said cover which contacts an entire base tray back wall so as to limit an amount of rotation of said cover with respect to said base tray.

8. The container of claim 7 wherein said motion limiting means limits the amount of rotation of said cover with respect to said base to approximately 180 degrees.

9. The container of claim 1 wherein said cover further includes:

at least one longitudinal front tab comprising a longitudinal protrusion disposed on said inside surface of said cover and parallel to a forward portion of said cover for retaining promotional material within said cover and between said tabbed protrusions.

10. The container of claim 9 wherein a terminus of one end of each said longitudinal protrusion is defined by said cover side walls.

11. The container of claim 9 wherein said cover includes one longitudinal protrusion having two ends and a terminus of each end of said protrusion is defined by said cover side walls.

12. The container of claim 9 wherein a forward portion of said longitudinal protrusion is tapered and a rear portion of said protrusion is perpendicular to said inside cover surface.

13. The container of claim 1 wherein said base tray further includes a recessed portion on an outer portion of said front wall.

* * * * *